United States Patent
Hasegawa et al.

(10) Patent No.: US 9,997,193 B1
(45) Date of Patent: Jun. 12, 2018

(54) SELECTIVE INDEX WRITING PRIOR TO UNTHREADING A MAGNETIC RECORDING TAPE

(71) Applicant: International Business Machines Corporation, Armonk, NY (US)

(72) Inventors: Tohru Hasegawa, Tokyo (JP); Masayuki Iwanaga, Urayasu (JP); Yutaka Oishi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/469,344

(22) Filed: Mar. 24, 2017

(51) Int. Cl.
*G11B 15/48* (2006.01)
*G11B 20/12* (2006.01)
*G11B 5/008* (2006.01)
*G11B 15/18* (2006.01)
*G11B 15/24* (2006.01)

(52) U.S. Cl.
CPC ...... *G11B 20/1201* (2013.01); *G11B 5/00813* (2013.01); *G11B 15/1883* (2013.01); *G11B 15/24* (2013.01)

(58) Field of Classification Search
CPC ....... G11B 15/43; G11B 15/48; G11B 15/026; G11B 15/442; G11B 15/093; G11B 2220/90; G11B 27/11; G11B 15/16

USPC ........... 360/55, 71, 69, 74.1, 132, 74.3, 72.3
See application file for complete search history.

(56) References Cited

U.S. PATENT DOCUMENTS

| 8,373,941 | B2 | 2/2013 | Bayang et al. |
| 8,780,483 | B2 * | 7/2014 | Mojica ................. G11B 15/689 360/55 |
| 2013/0135773 | A1 | 5/2013 | Mojica |
| 2015/0002958 | A1 | 1/2015 | Altknecht et al. |

OTHER PUBLICATIONS

IBM, "IBM TS3500 Tape Library," Aug. 9, 2016, pp. 1-2, Retrieved From http://www-03.ibm.com/systems/storage/tape/ts3500/specifications.html.

* cited by examiner

*Primary Examiner* — Nabil Hindi
(74) *Attorney, Agent, or Firm* — Zilka-Kotab, P.C.

(57) ABSTRACT

A drive-implemented method according to one embodiment includes determining that unthreading of a tape is to be performed, and in response to the determination that the unthreading of the tape is to be performed, determining whether to write an index on the tape prior to unthreading the tape. In response to a determination to write the index on the tape, the index is written on the tape prior to unthreading the tape. The tape is then unthreaded.

23 Claims, 12 Drawing Sheets

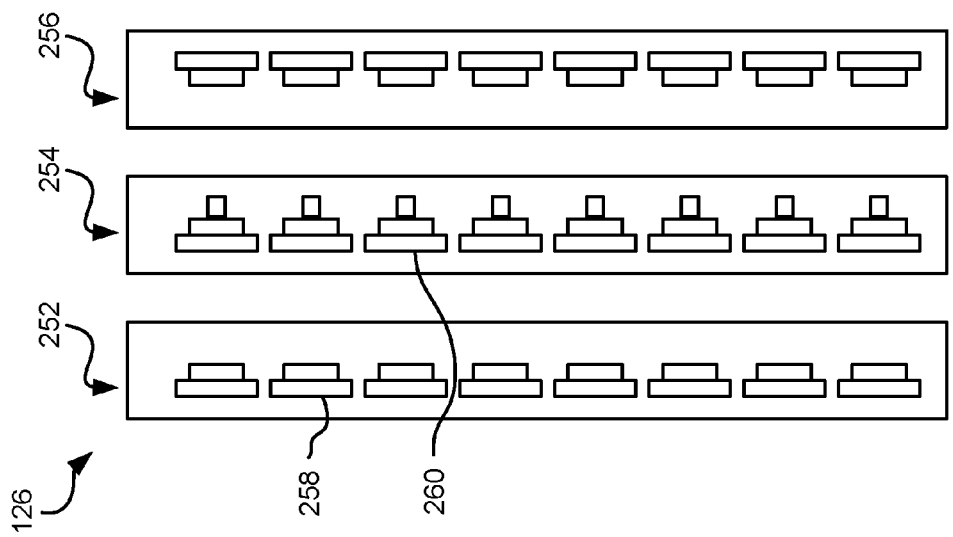
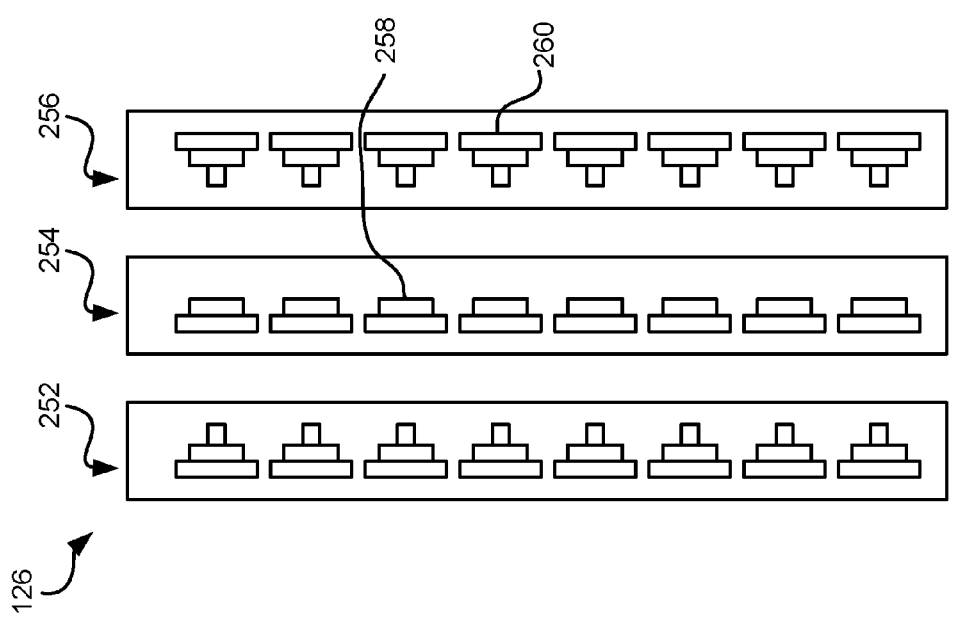

SELECTIVE INDEX WRITING PRIOR TO UNTHREADING A MAGNETIC RECORDING TAPE

BACKGROUND

The present invention relates to data storage systems, and more particularly, this invention relates to selectively writing an index on a magnetic recording tape.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

Another important and continuing goal in the data storage industry is that of decreasing the time and/or number of operations used when performing a given task within a tape drive system. For example, because stiction tends to occur between the tape and a magnetic tape head of a tape drive when the tape drive system is idle with a threaded tape therein, conventional tape drive systems often unthread magnetic tape that has not been accessed in a predetermined amount of time. Stiction has been known to be so strong that the tape may break rather than separate from the head. The unthreading is performed in an effort to prevent the stiction from forming. However, the tape remains loaded in the tape drive system and "mounted" for further operations until an unload and/or unmount command is received.

Because the index or indexes of the location of data written to a magnetic tape are not updated by the tape drive system prior to this unthreading, in the event that an unload and/or unmount command is received by the tape drive system while the tape is unthreaded, the tape must be rethreaded for recording such indexes. Moreover, depending on the indexing scheme used, much of the tape may need to be traversed to arrive at the location where the index is to be written, e.g., such as at the end of the last written data. This exacerbates the time required to write the index.

If the tape is not rethreaded to record such index, the index location of previously written data may be lost, which would require the tape drive system to parse the tape to find the data upon a subsequent loading of the tape. This parsing of the tape is undesirably time consuming.

Accordingly, conventional tape drive systems suffer from having to rethread a tape for indexing in response to receiving an unload and/or unmount command while the tape is unthreaded. Such rethreading to simply write index information is a time-consuming process, which affects the overall efficiency of the data storage system of which the tape drive system is a part. Conventional tape drive systems that do not rethread an unthreaded tape to write an index in a data partition of the tape may require a time-consuming reparsing of the tape when accessing data that was not adequately indexed.

SUMMARY

A drive-implemented method according to one embodiment includes determining that unthreading of a tape is to be performed, and in response to the determination that the unthreading of the tape is to be performed, determining whether to write an index on the tape prior to unthreading the tape. In response to a determination to write the index on the tape, the index is written on the tape prior to unthreading the tape. The tape is then unthreaded. This process improves the operational efficiency of both tape drive systems and data storage systems implementing such tape drive systems, by writing an index to a tape prior to unthreading of the tape when data has been written to the tape but has not yet been indexed, thereby potentially avoiding the necessity to rethread the tape in order to write an index thereto if an unmount or unload command is received while the tape is unthreaded.

Determining whether to write the index on the tape prior to unthreading the tape may include determining whether to write the index in a partition of the tape, the partition being selected from a group consisting of an index partition and a data partition of the tape. Writing the index to the data partition prior to unthreading the tape improves operational efficiency, for example, by eliminating rethreading the tape to append an index to the end of the last written data, in embodiments where an index is written at such a location.

In one embodiment, a write request may be received after the unthreading, upon which the tape is rethreaded and the data corresponding to the write request is written on the tape. The index that was stored on the tape prior to the unthreading is overwritten with the data corresponding to the write request, thereby reclaiming storage space on the tape.

The determination that unthreading of the tape is to be performed may be based on a predetermined period of time passing since a most recent access to the tape. Where the period of time is shorter than the expected onset of stiction, the many stiction-related issues may be avoided.

Prior to determining that unthreading of the tape is to be performed, an index may be written to a data partition of the tape in response to a predetermined period of time passing since a most recent access to the tape. Preferably, the index is not written to an index partition of the tape in response to the predetermined period of time passing since the most recent access to the tape. Writing the index to the data partition prior to unthreading the tape improves operational efficiency, for example, by eliminating rethreading the tape to append an index to the end of the last written data, in embodiments where an index is written at such a location. However, where the index partition is near a beginning of tape, the tape may be rethreaded and the index written to the index partition. Several tens of seconds are still saved.

A computer program product according to one embodiment comprise a computer readable storage medium having program instructions embodied therewith. The program instructions are executable by a controller to cause the controller to: determine, by the controller, that unthreading of a tape is to be performed. In response to the determination that the unthreading of the tape is to be performed, a determination is made, by the controller, whether to write an index in a data partition of the tape prior to unthreading the tape. In response to a determination to write the index in the data partition, the controller instructs writing of the index in the data partition prior to unthreading the tape. In response to the determination that the unthreading of the tape is to be performed, a determination is made by the controller whether to write the index in an index partition of the tape prior to unthreading the tape. In response to a determination to write the index in the index partition, an instruction, by the controller, is made to write the index in the index partition prior to unthreading the tape. A threading mechanism is instructed to unthread the tape. This process improves the operational efficiency of both tape drive systems and data storage systems implementing such tape drive systems, by writing an index to a tape prior to unthreading of the tape when data has been written to the tape but has not yet been indexed, thereby potentially avoiding the necessity to rethread the tape in order to write an index thereto if an unmount or unload command is received while the tape is unthreaded.

An apparatus according to one embodiment includes a controller, and logic integrated with the controller, executable by the controller, or integrated with and executable by the controller, the logic being configured to perform the foregoing method.

Accordingly, various embodiments improve the operational efficiency of both tape drive systems and data storage systems implementing such tape drive systems, by writing an index to a tape prior to unthreading of the tape when data has been written to the tape but has not yet been indexed.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

Figure 1A:
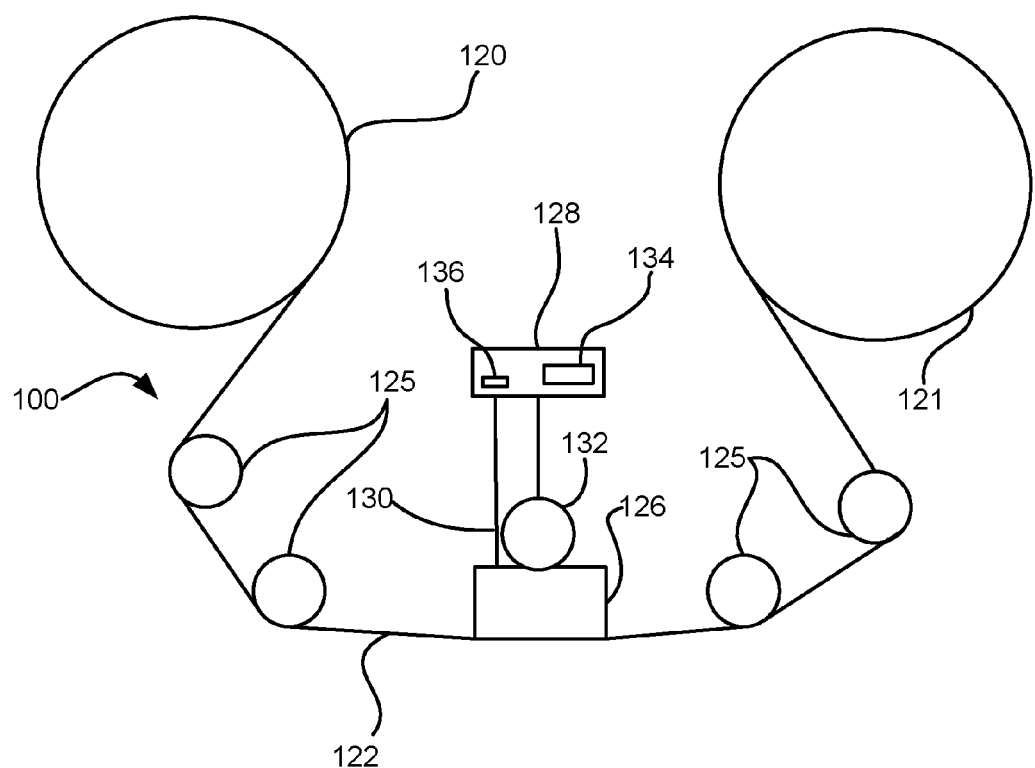
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Particularly, various embodiments implement selective index writing in tape drive systems to overcome the drawbacks associated with handling an unthreaded tape upon receiving an unload or unmount command, and moreover improving the operational efficiency of both tape drive systems and data storage systems implementing such tape drive systems, by writing an index to a tape prior to unthreading of the tape when data has been written to the tape but has not yet been indexed.

As used in the description of the various embodiments herein, the term "index" is meant to refer to any type of index information, such as an entire index, an index entry, a portion of an index, metadata describing at least one of an identity and a location of a data object on the tape, etc.

In one general embodiment, a drive-implemented method includes determining that unthreading of a tape is to be performed, and in response to the determination that the unthreading of the tape is to be performed, determining whether to write an index on the tape prior to unthreading the tape. In response to a determination to write the index on the tape, the index is written on the tape prior to unthreading the tape. The tape is then unthreaded.

In another general embodiment, a computer program product comprises a computer readable storage medium having program instructions embodied therewith. The program instructions are executable by a controller to cause the controller to: determine, by the controller, that unthreading of a tape is to be performed. In response to the determination that the unthreading of the tape is to be performed, a determination is made, by the controller, whether to write an index in a data partition of the tape prior to unthreading the tape. In response to a determination to write the index in the data partition, the controller instructs writing of the index in the data partition prior to unthreading the tape. In response to the determination that the unthreading of the tape is to be performed, a determination is made by the controller whether to write the index in an index partition of the tape prior to unthreading the tape. In response to a determination to write the index in the index partition, an instruction, by the controller, is made to write the index in the index partition prior to unthreading the tape. A threading mechanism is instructed to unthread the tape.

In yet another general embodiment, an apparatus includes a controller, and logic integrated with the controller, executable by the controller, or integrated with and executable by the controller, the logic being configured to perform the foregoing method.

FIG. 1A illustrates a simplified tape drive 100, which may form part of a larger tape-based data storage system. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive 100, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
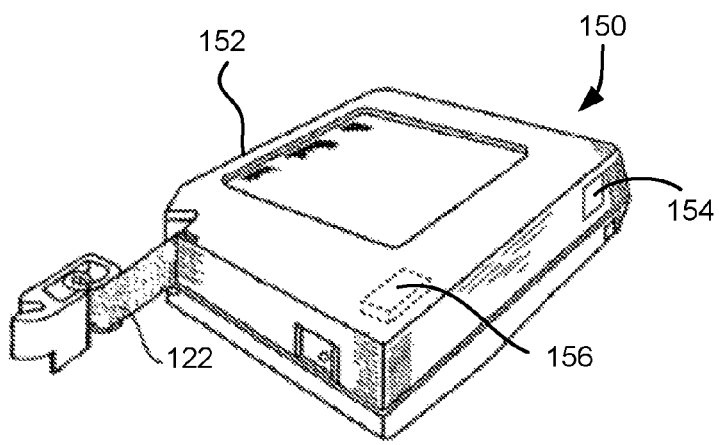
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or another device.

Figure 2A:
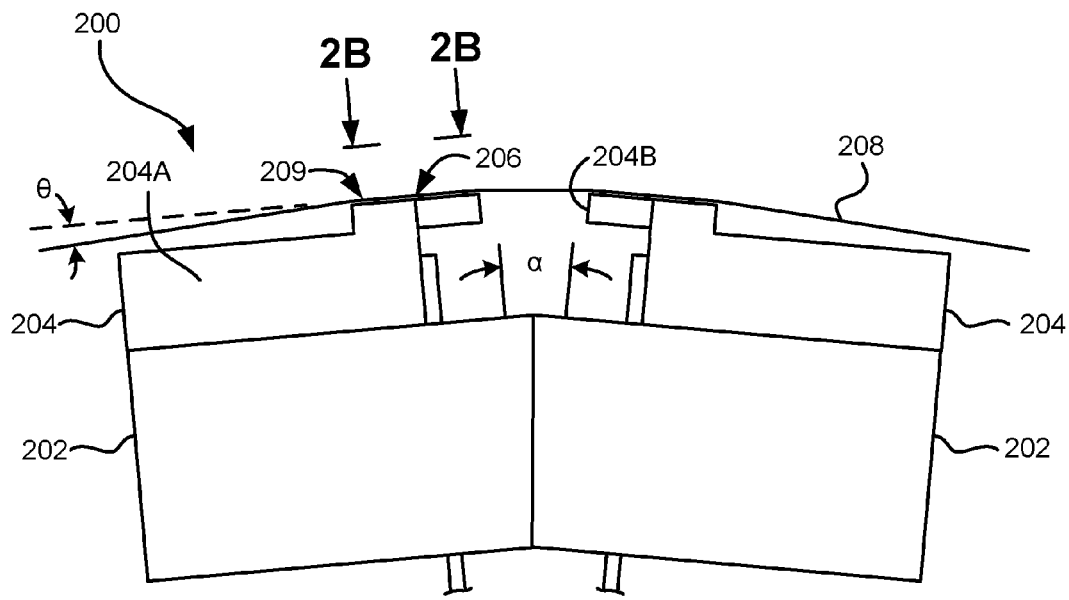
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
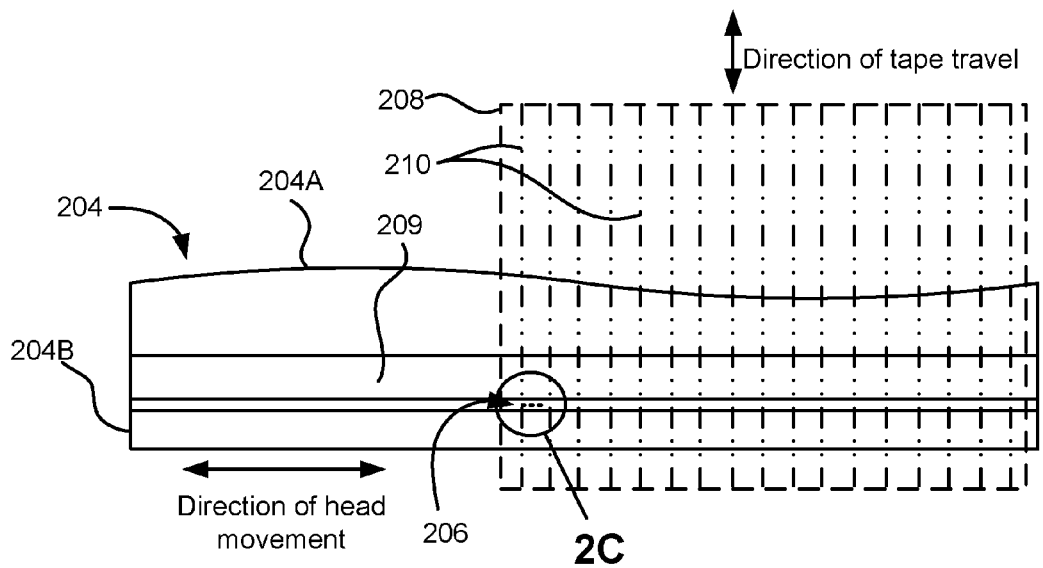
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
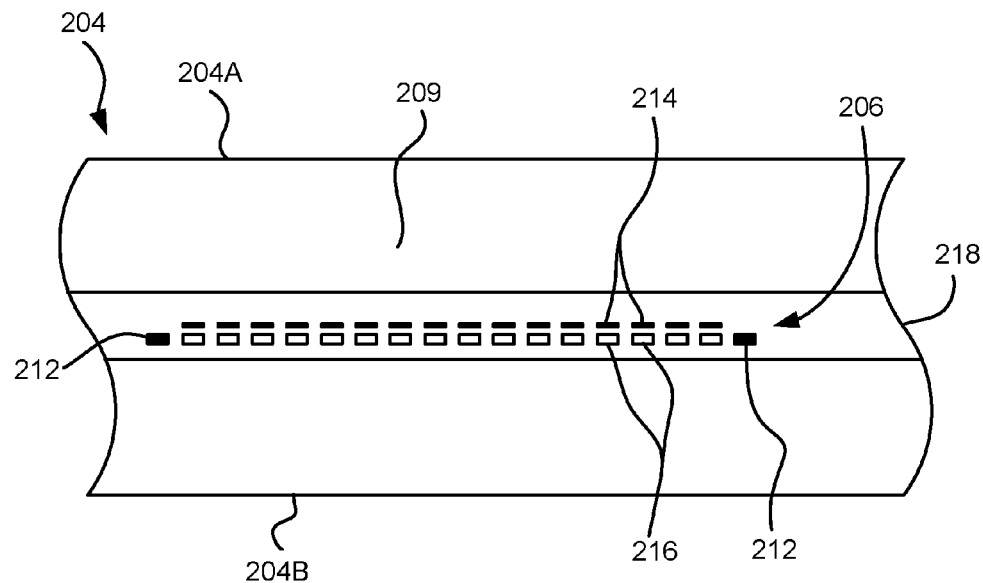
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
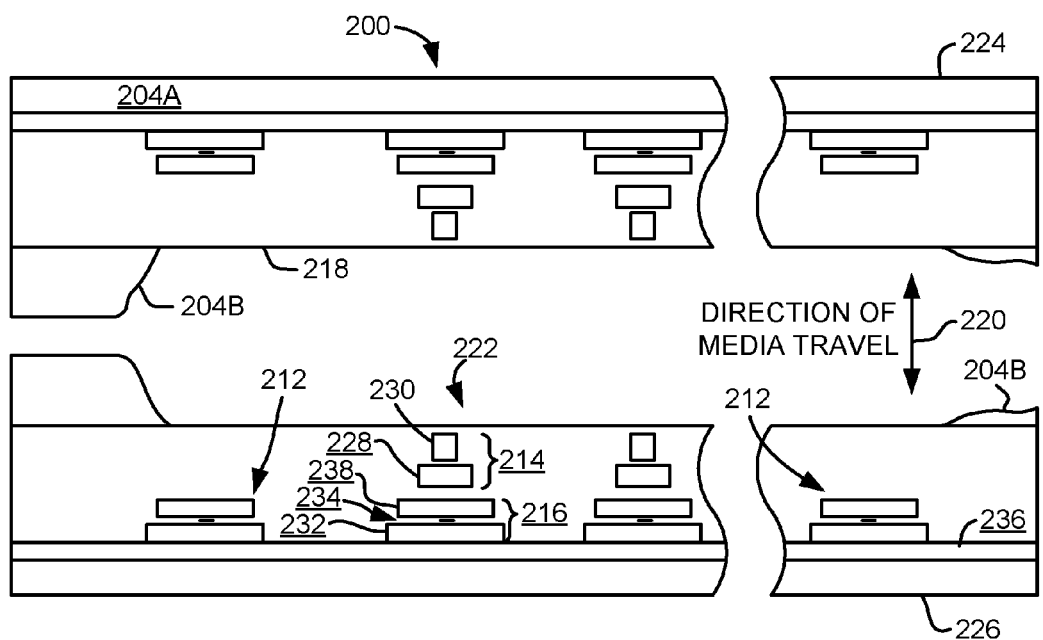
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
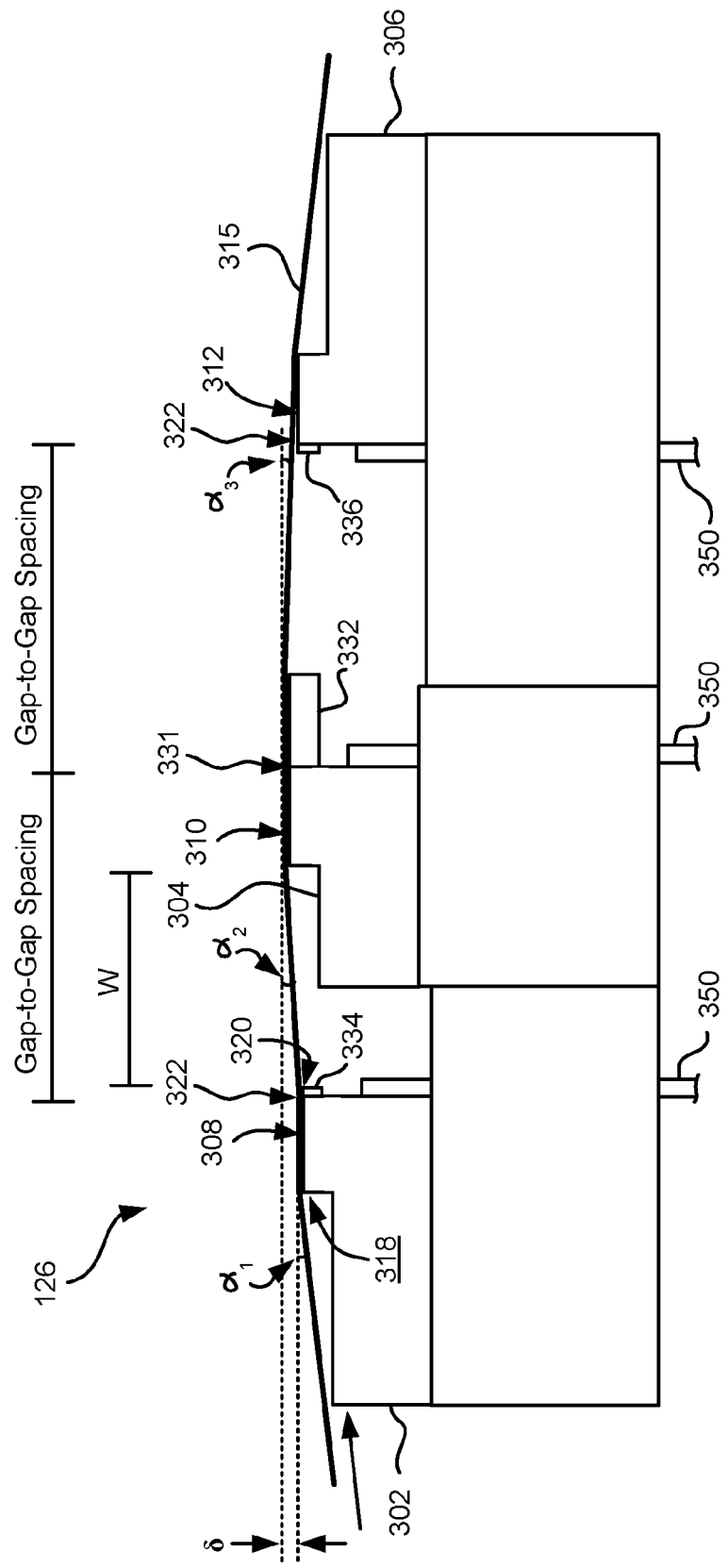
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also, note that the outer modules 302, 306 will alternate as leading modules, depending on the direction of travel of the tape 315.

Figure 6:
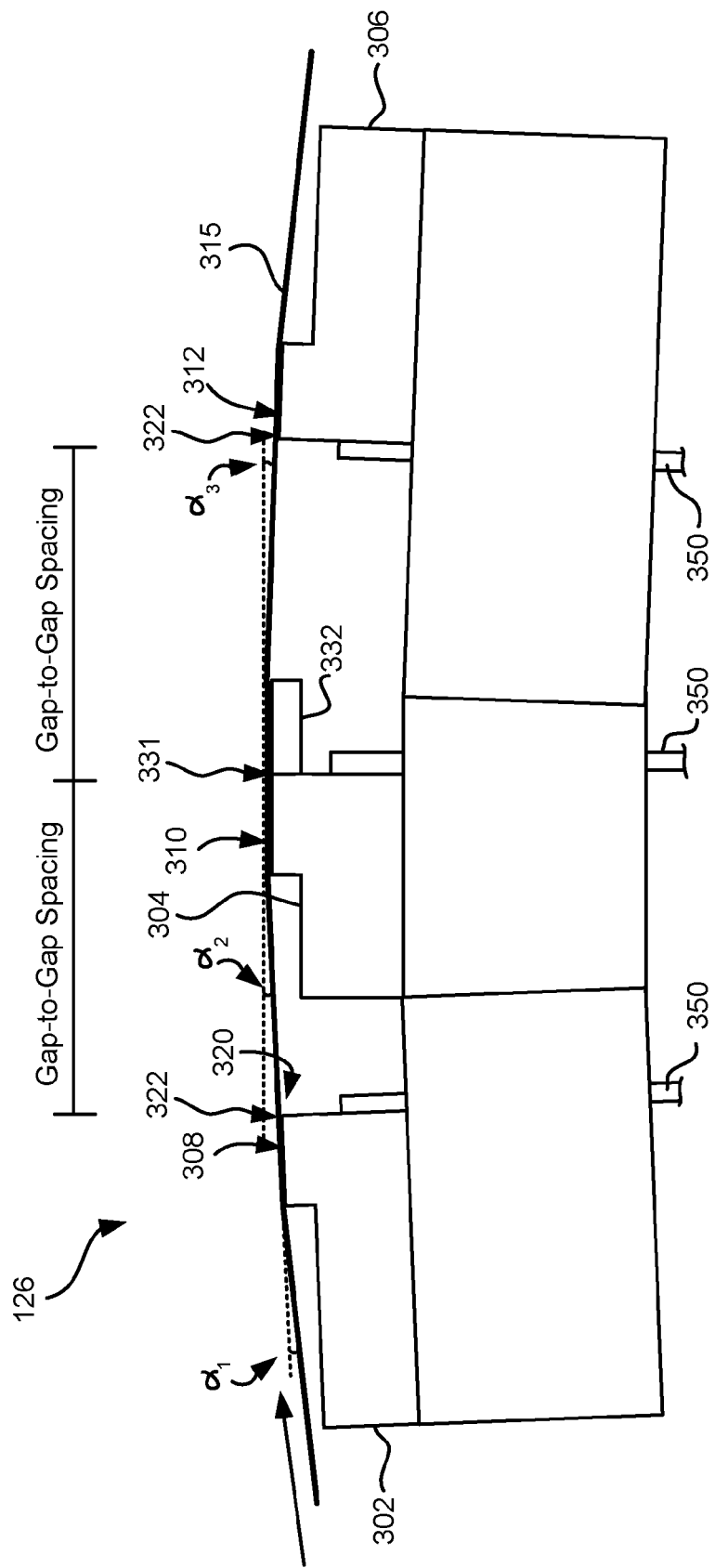
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used Linear Tape Open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
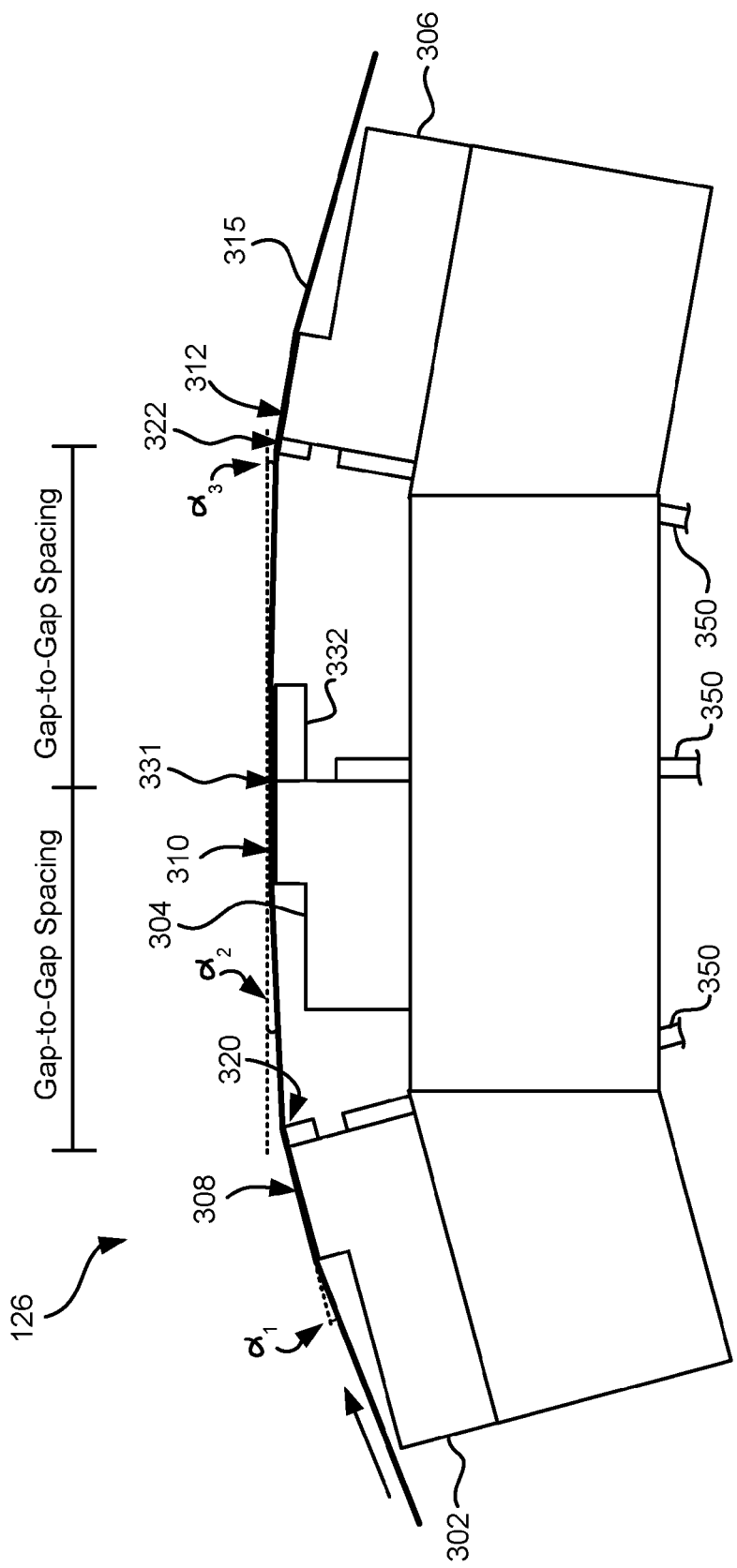
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
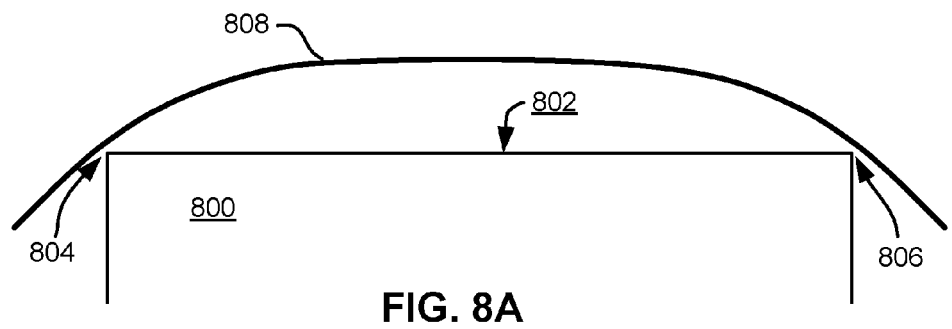
FIGS. 8A-8C are schematics depicting the principles of tape tenting.
Figure 8B:
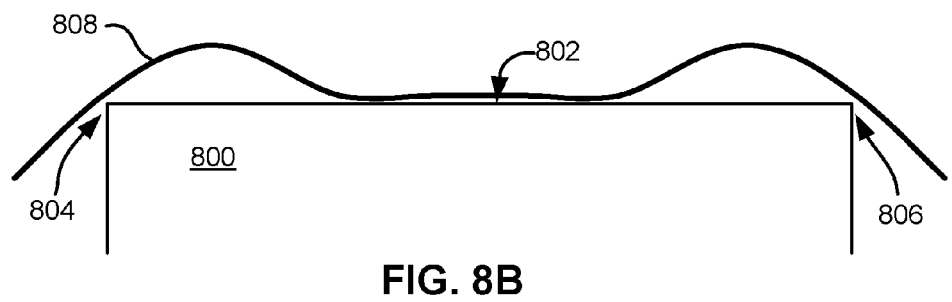
Figure 8C:
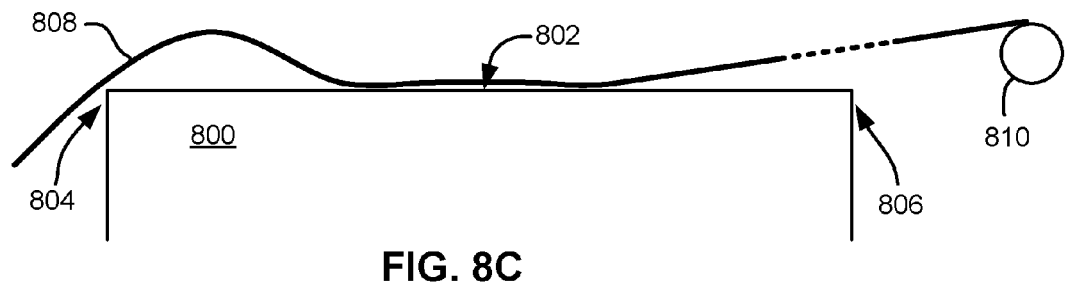

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
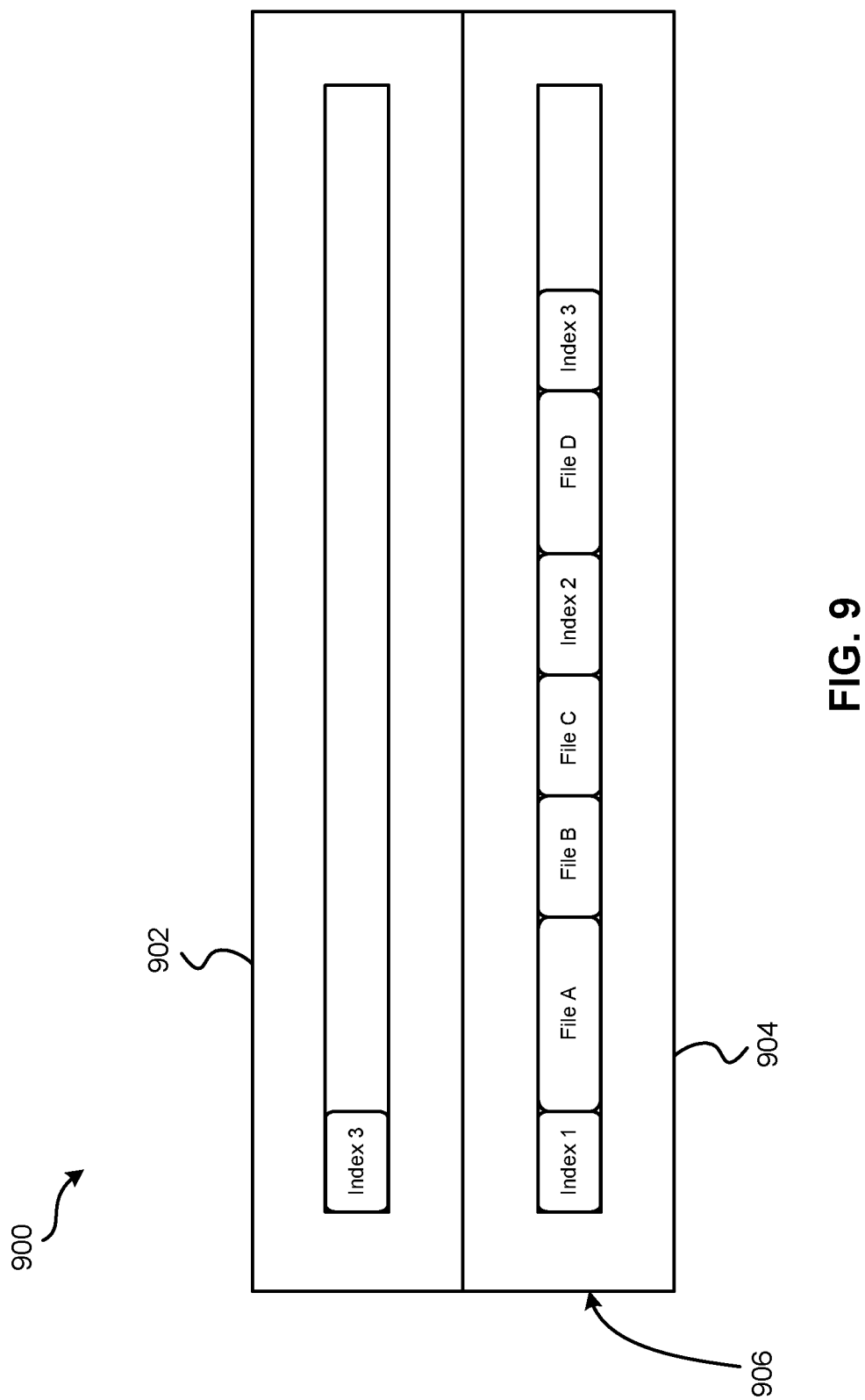
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information in the index partition, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

Conventionally, the metadata is updated in the index partition 902 and/or the data partition 904 only upon receiving an unmount and/or unload command. According to some embodiments, the metadata of the index partition 902 may be updated in response to the tape being unmounted, e.g., such that the index may be read from the index partition when that tape is mounted again. The metadata may also be written in the data partition 902 so the tape may be mounted using the metadata recorded in the data partition 902, e.g., as a backup option.

Various embodiments described herein implement selective index writing prior to unthreading a magnetic recording tape. Such selective index writing minimizes the time that would otherwise be used to rethread a magnetic tape to record an index prior to unloading the magnetic tape from a tape drive, e.g., in response to receiving an unload request.

Figure 10:
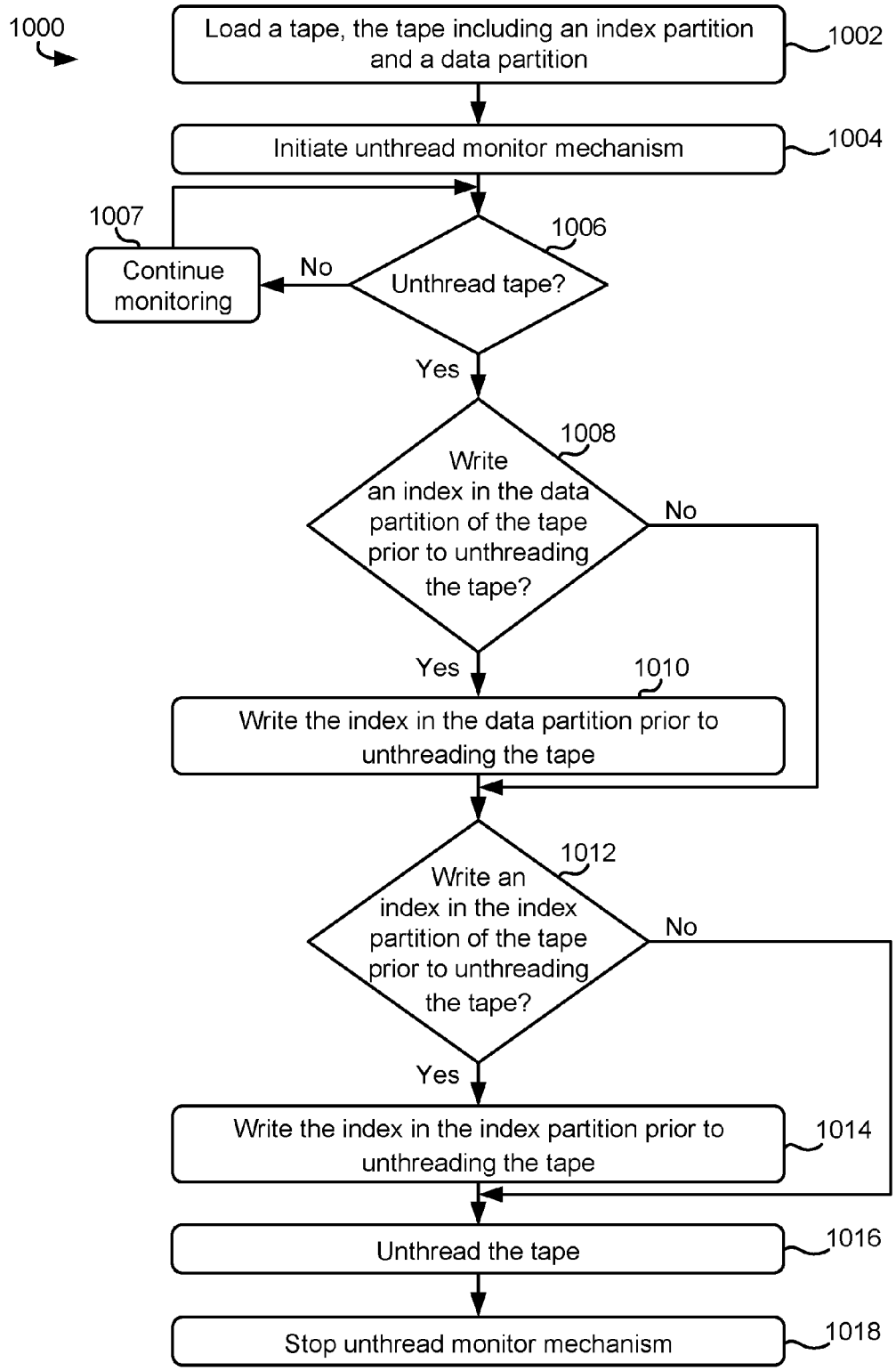
FIG. 10 is a flowchart of a method of selective write indexing to a magnetic recording tape, according to one embodiment.

Looking to FIG. 10, a method 1000 includes a process for selective index writing in accordance with one embodiment. As an option, the present method 1000 may be implemented in conjunction with features from any other embodiment listed herein, such as those described with reference to the other FIGS., such as FIG. 10. However, such method 1000 and others presented herein may be used in various applications and/or in permutations which may or may not be specifically described in the illustrative embodiments listed herein. Further, the method 1000 presented herein may be used in any desired environment. Thus FIG. 10 (and the other FIGS.) may be deemed to include any possible permutation.

Operation 1002 of method 1000 includes loading a tape into a tape drive. The tape may include an index partition and a data partition. The index partition may store an index including meta information of a file of a file system, e.g., see FIG. 9. The data partition may store a body of the file and the index, e.g., see FIG. 9.

According to various embodiments, the body and the index may be appended to the data partition. For example, referring to FIG. 9, a body of data "File D" and index "Index 3" is illustrated appended to the data partition 904.

Referring again to FIG. 10, when the tape is threaded in the tape drive and is stationary, the tape may be unthreaded, e.g., to prevent stiction from forming between the tape and a magnetic tape head of the tape drive. As described elsewhere herein, stiction may form between the tape and a magnetic tape head of the tape drive in response to the stationary tape lying on the magnetic head of the tape drive while the tape is not accessed. Unthreading the tape removes the tape from the magnetic head and winds the tape back onto a tape supply cartridge, e.g., see tape supply cartridge 120 of FIG. 1A.

With continued reference to method 1000, operation 1004 includes initiating an unthread monitor mechanism. The unthread monitor mechanism may be a process for determining whether or not unthreading of the tape should be initiated and/or is desirable. According to one embodiment, the unthread monitor mechanism is executed by the controller of the tape drive. In some approaches, the unthread monitor mechanism may receive an instruction to unthread a tape from a storage controller that monitors a plurality of tape drives of a larger system, e.g., in embodiments where a tape library includes multiple tape drives. In further approaches, the unthread monitor mechanism may receive an instruction to unthread a tape from a host, etc.

According to various embodiments, the unthread monitor mechanism may be initiated in response to any determination being made and/or in response to receiving any type of input. According to one approach, the unthread monitor mechanism may be initiated in response to a tape being threaded in the tape drive. According to another approach, the unthread monitor mechanism may be initiated in response to a detection being made that a tape cartridge has been loaded into a tape drive. According to yet another approach, the unthread monitor mechanism may be initiated in response to receiving an input from a user to initiate the unthread monitor mechanism. According to a further approach, the unthread monitor mechanism may be initiated in response to receiving an input from a storage controller to initiate the unthread monitor mechanism.

According to one approach the unthread monitor mechanism may record a time of a most recent access to the tape, where an access to the tape may include threading of the tape, writing to the tape, reading from the tape, etc. In such an approach, the recorded time corresponding to a particular tape may be reset in response to another access to that tape.

Decision 1006 of method 1000 includes determining whether tape unthreading is to be performed. A determination that unthreading of the tape is to be performed may be based on one or more variables in any combination, e.g., comparisons, thresholds, inputs, etc. According to one embodiment, the determination that unthreading of the tape is to be performed may be based on a first predetermined period of time passing since a most recent access to the tape. The first predetermined period of time may include any designated time period. Preferably, the first predetermined period of time is less than a time period which is known or suspected to result in stiction of the tape to the magnetic tape head; accordingly, the incidence of stiction may be desirably reduced.

The first predetermined period of time may be represented by a stored value, a user-defined value, a value received from a storage controller, etc. According to various approaches, the first predetermined period of time may include, e.g., ten seconds, thirty seconds, and/or one minute. According to other approaches, the first predetermined period of time may include, e.g., two minutes, five minutes, ten minutes, fifteen minutes, etc. According to yet other approaches, the first predetermined period of time may include, e.g., thirty minutes, one hour, three hours, six hours, etc.

According to another embodiment, the determination that unthreading of the tape is to be performed may be based on a downtime of the tape drive being scheduled while the tape is loaded in the tape drive. According to one approach, in such an embodiment, the scheduled duration of downtime may be compared to a threshold, e.g., such as the first predetermined period of time.

It should be noted that any determination of method 1000 and other methods described herein may additionally and/or alternatively be received from a storage library.

According to another embodiment, the determination that unthreading of the tape is to be performed may be based on a received input, e.g., from a user.

According to yet another embodiment, the determination that unthreading of the tape is to be performed may be based on the use of an algorithm similar to that of an automatic unthread function which may be implemented in the tape drive.

According to yet another embodiment, the determination that unthreading of the tape is to be performed may be made in response to receiving notification from a storage controller, e.g., of a tape library, regarding the desirability of unthreading.

In response to the determination that the unthreading of the tape is not to be performed (as illustrated by the "No" logical path leading from decision 1006), unthreading monitoring may continue, e.g., see operation 1007. Unthreading monitoring may continue for any amount of time and/or until any type of condition is met. According to one approach, the unthreading monitoring may continue until it is determined that the tape is to be unthreaded. According to another approach, unthreading monitoring may continue until the tape is unloaded. According to yet another approach unthreading monitoring may continue for a predetermined amount of time. According to yet another approach unthreading monitoring may continue for a predetermined number of determinations of decision 1006.

With continued reference to decision 1006, in response to a determination that the unthreading of the tape is to be performed (as illustrated by the "Yes" logical path leading from decision 1006), a determination may be made as to whether to write an index in a data partition of the tape prior to unthreading the tape, e.g., see decision 1008.

In general, the determination of whether to write an index in a data partition of the tape prior to unthreading the tape may be based on parameters such as whether data was written to the tape after the last index was written, whether data was logically deleted from the tape after the last index was written, etc. In response to a determination to write the index in the data partition (as illustrated by the "Yes" logical path leading from decision 1008), the index may be written in the data partition prior to unthreading the tape, e.g., see operation 1010.

The index may be written to the data partition of the tape prior to unthreading the tape, so that the tape does not have to be rethreaded to record the index to the data partition in the event that an unmount and/or unload request occurs while the tape is unthreaded. In other words, in response to writing the index to the data partition of the tape prior to unthreading the tape, the tape may be readily unloadable from the tape drive at any time after being unthreaded.

In response to a determination not to write the index in the data partition (as illustrated by the "No" logical path leading from decision 1008), the index may not be written in the data partition prior to unthreading the tape. In response to such a determination, a determination may be made as to whether to write an index in an index partition of the tape prior to unthreading the tape, e.g., see decision 1012.

Decision 1012 of method 1000 includes determining whether to write an index in an index partition of the tape prior to unthreading the tape. Decision 1012 may be made in response to the determination that the unthreading of the tape is to be performed, and/or parameters such as those used in decision 1008.

In response to a determination not to write the index in the index partition (as illustrated by the "No" logical path leading from decision 1012), the index may not be written in the index partition prior to unthreading the tape. In response to such a determination, the tape may be unthreaded, e.g., see operation 1016.

In response to a determination to write the index in the index partition (as illustrated by the "Yes" logical path leading from decision 1012), the index may be written in the index partition prior to unthreading the tape, e.g., see operation 1014. The index may be written to the index partition of the tape prior to unthreading the tape so that the tape does not have to be rethreaded to record the index to the index partition, in the event that an unmount request and/or unload request occurs while the tape is unthreaded.

Accordingly, as will be described in greater detail elsewhere herein, once unthreaded, the tape may be immediately unloaded from the tape drive and/or unmounted upon receiving such a request because the index has already been written to the index partition and/or the data partition prior to unthreading the tape.

The availability of immediate unloaded would not otherwise be available were the index not written to the index partition and/or data partition prior to unthreading the tape. For example, were the index not written to the index partition and/or data partition prior to unthreading the tape, the following operations would need to be performed in conventional tape drive systems (prior to unthreading the tape): 1) rethreading of the tape, 2) moving the head to the location of the data at the end of the data partition, 3) writing the index to the data partition, 4) moving the head to the index partition, 5) writing the index in the index partition, and finally 6) performing the unthreading of the tape.

By writing the index to the index partition and/or writing the index to the data partition prior to unthreading the tape using the embodiments described herein, the tape may become readily unloadable without performing the above conventional operations, and thus the time required to unload a tape is greatly reduced. For example, the time for completing writing of the index depends on the size of the index, e.g., the number of stored files and directories, etc. In view of the general usage of tapes, the write time may be on the order of several seconds to several tens of seconds. Movement of the head departing from the state where the tape is unthreaded to the location of the data at the end of the data partition (see conventional operation 4 above), and movement of the head after writing of the index in the data partition to the index partition will each take, on average, about 50 seconds, and possibly up to 100 seconds or more.

Hence, implementation of various embodiments of the present invention may reduce the time required to unmount the tape by at least one hundred seconds on average. This reduction of time may extend up to two hundred seconds or more in some cases.

With continued reference to FIG. 10, operation 1016 of method 1000 includes unthreading the tape. According to various embodiments, the tape may remain mounted after the unthreading. The tape remaining mounted after the unthreading may prevent the tape from having to be remounted in response to any operation in which the tape is rethreaded, e.g., for performing a data read and/or write operation. This may alleviate the time that would otherwise be consumed if the tape had been unmounted after unthreading.

According to various embodiments, a read and/or write request may be received after the unthreading. In response to receiving a read and/or write request after the unthreading, the process 1000 may return to decision 1006. In one approach, in response to receiving a write request, the tape may be rethreaded, so that the write may be performed on the tape. The data corresponding to the write request is written in the data partition. During this write and/or at any subsequent write, the index stored in the data partition prior to the unthreading may be overwritten with the data corresponding to the write request, thereby recapturing storage space on the tape.

Referring again to FIG. 9, an example of rethreading a tape in response to receiving a write request, where the index stored in the data partition prior to the unthreading is overwritten with the data corresponding to the write request, will now be described below.

Assume that at some time after File D is written in the data partition 904 of the tape, and Index 3 is written in the data partition and the index partition of the magnetic tape 900 in response to the magnetic tape 900 being unthreaded from the tape drive. The magnetic tape 900 may be unthreaded from the tape drive in response to any determination(s) being made and/or in response to any condition(s) being met, e.g., as described elsewhere herein.

Assume also that at some time after magnetic tape 900 is unthreaded from the tape drive, a write request is received. In response to the write request being received, the magnetic tape 900 may be rethreaded. With the magnetic tape 900 rethreaded, Index 3 stored in the data partition (prior to the unthreading) may be overwritten with the data corresponding to the write request.

At some point in time, the tape may be unmounted after the unthreading. According to various embodiments, the tape may be unmounted after the unthreading in response to the index being written to the index partition and/or the data partition, and where the tape is to be unloaded.

Referring again to method 1000, operation 1018 includes stopping the unthread monitor mechanism. According to various embodiments, the unthread monitor mechanism may be stopped in response to any determination(s) being made and/or in response to any condition(s) being met. According to one approach, the unthread monitor mechanism may be stopped in response to the tape being unthreaded. According to another approach, the unthread monitor mechanism may be stopped in response to the tape being unloaded from the tape drive. According to yet another approach, the unthread monitor mechanism may be stopped in response to the index being written in the data partition and/or index partition of the tape.

It should be noted that according to various embodiments, the unthread monitor mechanism and/or any operation of method 1000 may be initiated/performed again at any time prior to the unthread monitor mechanism stopping. According to one approach, the unthread monitor mechanism and/or any operation of method 1000 may be initiated/performed again in response to a tape being loaded into the tape drive. According to another approach, the unthread monitor mechanism and/or any operation of method 1000 may be initiated/performed again in response to a tape being threaded in the tape drive.

Various embodiments, including the process 1000 of FIG. 10, may also and/or alternatively include an operation of writing the index in the data partition once in every predetermined time period, e.g., a second predetermined period of time. This feature helps ensure that an index is written somewhere on the tape in the event of a power failure, drive failure, etc. Moreover, by writing such index in the data partition, e.g., at the current location on tape proximate to the head, little or no seek time is required to locate the position on tape to write the index. Upon receiving a next write command, the tape is approximately in the correct location to begin writing, thereby minimizing the time required to begin writing. The index may be overwritten upon performing the requested write operation.

Figure 11:
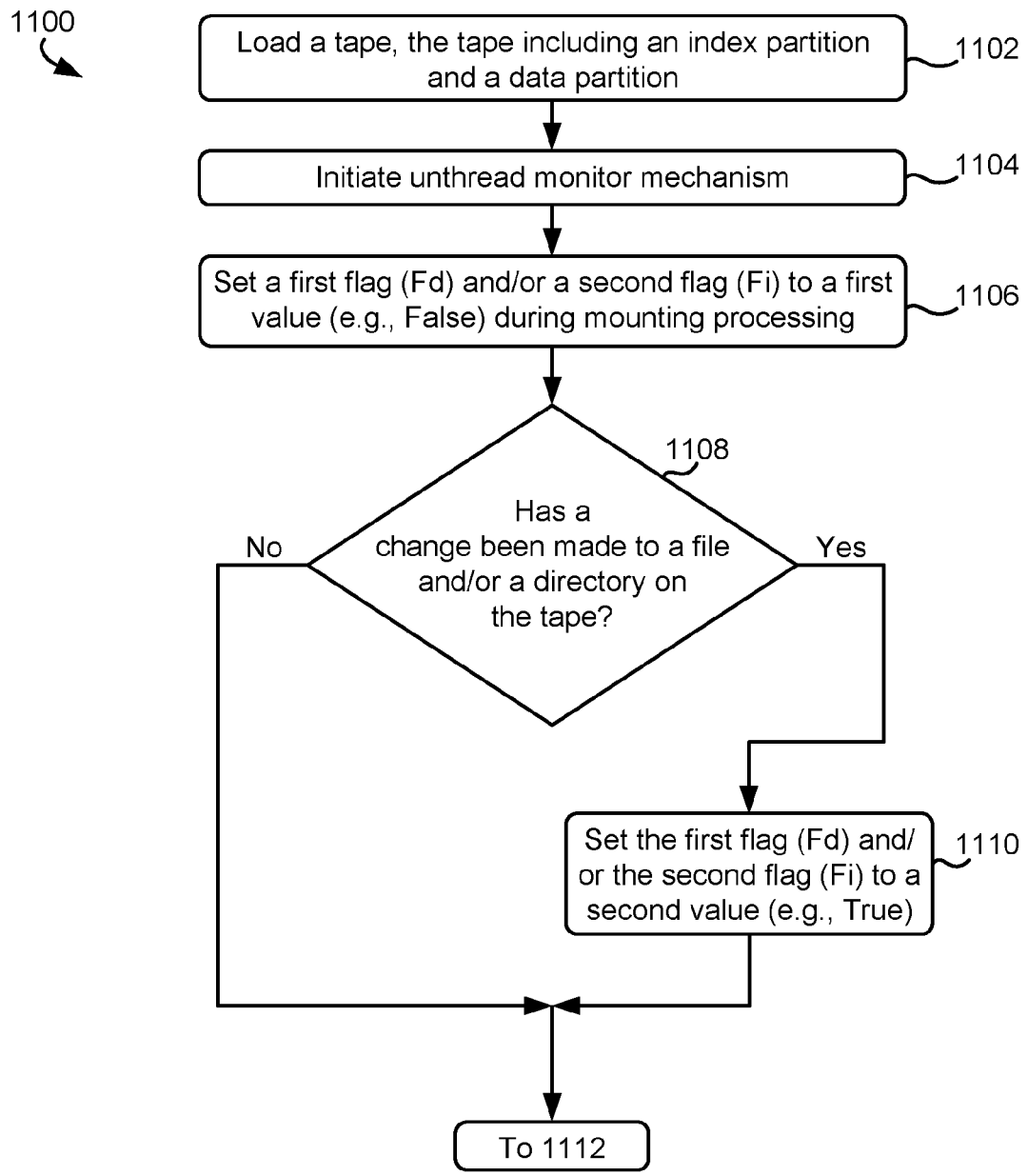
FIG. 11 is a flowchart of a method of selective write indexing to a magnetic recording tape, according to one embodiment.
Figure 11:
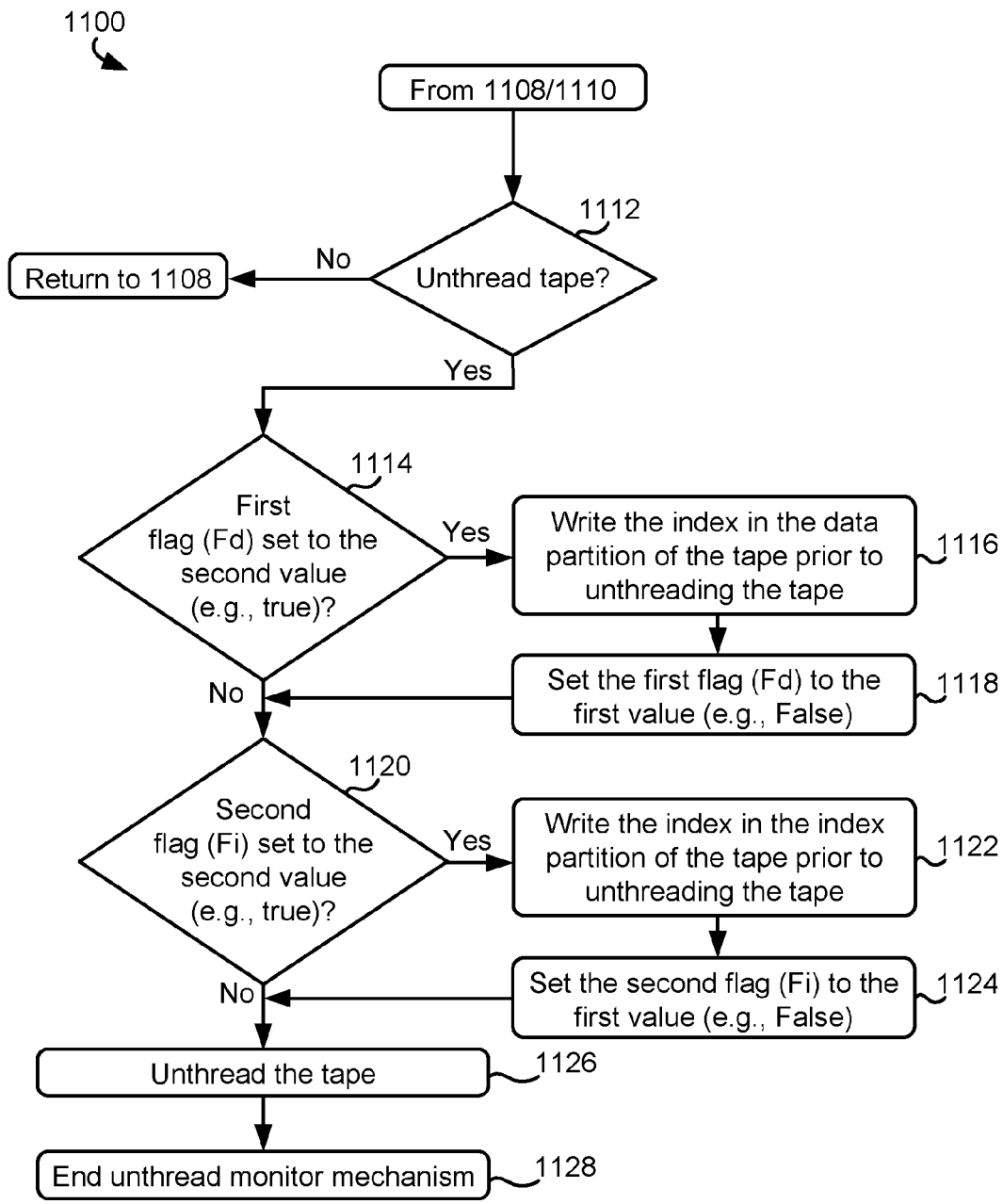

When this second predetermined time period is specified to be shorter than the interval between the timings of the automatic unthreading of the tape drive, the index may be written to the data partition of the unthreaded tape prior to determining that unthreading of the tape is to be performed, in a similar manner to the embodiments described herein. Upon determining to unthread the tape, the index already thus written in the data partition need not be rewritten. However, if the index has not also been written to the index partition, the index may be written to the index partition prior to unthreading. Nonetheless, a net reduction of time is achieved, typically on the order of several tens of seconds. While any technique for performing the foregoing functionality may be used, FIG. 11 depicts a method of using flags to determine whether to write an index or indices. The flags indicate whether an index needs to be written.

Looking to FIG. 11, the method 1100 includes a process for selective index writing in accordance with one embodiment. As an option, the present method 1100 may be implemented in conjunction with features from any other embodiment listed herein, such as those described with reference to the other FIGS., such as FIGS. 9 and 10. However, such method 1100 and others presented herein may be used in various applications and/or in permutations which may or may not be specifically described in the illustrative embodiments listed herein. Further, the method 1100 presented herein may be used in any desired environment. Thus FIG. 11 (and the other FIGS.) may be deemed to include any possible permutation.

Operation 1102 of method 1100 includes loading a tape into a tape drive. The tape may include an index partition and a data partition. The index partition may store an index including meta information of a file of a file system, e.g., see FIG. 9. The data partition may store a body of the file and the index, e.g., see FIG. 9.

When the tape is threaded in the tape drive and is stationary, the tape may be unthreaded, e.g., to prevent stiction from forming between the stationary tape and a magnetic tape head of the tape drive.

Operation 1104 of method 1100 includes initiating an unthread monitor mechanism. The unthread monitor mechanism may be a process for determining whether or not unthreading of the tape should be initiated and/or is desirable. According to one embodiment, the unthread monitor mechanism is executed by the controller of the tape drive. In some approaches, the unthread monitor mechanism may receive an instruction to unthread a tape from a storage controller that monitors a plurality of tape drives of a larger system, e.g., in embodiments where a tape library includes multiple tape drives. In further approaches, the unthread monitor mechanism may receive an instruction to unthread a tape from a host, etc.

According to various embodiments, the unthread monitor mechanism may be initiated in response to any determination being made and/or in response to receiving any type of input. According to one approach, the unthread monitor mechanism may be initiated in response to a tape being threaded in the tape drive. According to another approach, the unthread monitor mechanism may be initiated in response to a detection being made that a tape cartridge has been loaded into a tape drive. According to yet another approach, the unthread monitor mechanism may be initiated in response to receiving an input from a user to initiate the unthread monitor mechanism.

According to a further approach, the unthread monitor mechanism may be initiated in response to receiving an input from a storage controller to initiate the unthread monitor mechanism.

According to one approach the unthread monitor mechanism may record a time of a most recent access to the tape, where an access to the tape may include threading of the tape, writing to the tape, reading from the tape, etc. In such an approach, the recorded time corresponding to a particular tape may be reset in response to another access to that tape.

Operation 1106 includes setting a first flag "Fd" and/or a second flag "Fi", to a first value during mounting processing. Although herein referred to as a "flag," the first flag and/or the second flag may be any type of indicator that would be understood by one skilled in the art upon reading the present descriptions. According to various embodiments, the first flag and/or the second flag may additionally and/or alternatively include, e.g., a bit value, a series of bit values, a state in a register, etc. Similarly, the first value may be any type of value that would be understood by one skilled in the art upon reading the present descriptions. According to various embodiments, the first value may be set to, e.g., a true/false value, a 1/0 value, an on/off value, etc. According to one embodiment, as illustrated in method 1100, the first flag "Fd" and/or a second flag "Fi" may be set to a first value of "False" during mounting processing.

Setting the first flag and/or the second flag to a first value during mounting processing may establish a reference that may be used to determine whether or not data has been written to a tape subsequent to the tape being loaded into the tape drive. For example, setting the first flag and/or the second flag to a first value may correspond to no data yet being written to the tape since a past writing of the index in the index and/or data partition. The first flag and/or the second flag may be set to a different value in response to a change being made to at least one of a file and a directory on the tape, e.g., see operations 1108-1110, and/or operations 1114-1124.

Decision 1108 includes determining whether a change has been made to at least one of a file and a directory on the tape. According to various embodiments, determining whether a change has been made to at least one of a file and a directory on the tape may include any known comparison method and/or condition checking process. According to one approach, determining if a change has been made to at least one of a file and a directory on the tape may include determining if a write has occurred to the tape, whether data has been logically deleted, etc., e.g., since a last index was written. According to another approach, determining if a change has been made to at least one of a file and a directory on the tape may include comparing an amount of data presently written to an amount of data that was present on the tape at a previous time. According to yet another approach, determining if a change has been made to at least one of a file and a directory on the tape may include checking the state and/or value of a flag, where the state and/or value of the flag may be changed and/or set to a particular state and/or value in response to a change being made to at least one of a file and a directory on the tape.

In response to detecting and/or making a change to at least one of a file and a directory on the tape (as illustrated by the "Yes" logical path leading from decision 1108) the first flag and/or the second flag may be set to a second value, e.g., see operation 1110. Similar to the first value, the second value may be any type of value that would be understood by one skilled in the art upon reading the present descriptions. According to various embodiments, the second value may be set to, e.g., a true/false value, a 1/0 value, an on/off value, etc.

The first flag and/or the second flag may be set to a second value in response to detecting and/or making a change to at least one of a file and a directory on the tape, to represent that an updated index should be written in the index partition and/or data partition of the tape. Descriptions detailing using the flags when determining if the updated index should be stored will be described with reference to operations 1114-1124.

In response to not detecting and/or making a change to at least one of a file and a directory on the tape (as illustrated by the "No" logical path leading from decision 1108) the first flag and/or the second flag may not be changed. According to one embodiment, not changing the first flag and/or the second flag in response to not making a change to at least one of a file and a directory on the tape may include keeping the first value of the first flag and/or the second flag that was assigned to the first flag and/or the second flag during the mounting processing, e.g., see operation 1106.

If, after operation 1110, an index is written to the data portion, e.g., because a predetermined period of time has passed, but a decision to unthread the tape has not yet been made, the first flag may be set to the first value to indicate that the index written therein is current.

Decision 1112 of method 1100 includes determining whether tape unthreading is to be performed. Decision 1112 may be performed in a similar manner as decision 1006 of FIG. 10 and/or any other embodiment described herein. In response to the determination that the unthreading of the tape is not to be performed (as illustrated by the "No" logical path leading from decision 1112), a determination may be made as to whether a change has been made to at least one of a file and a directory on the tape, e.g., see "No" logical path of decision 1112 return to decision 1108.

In response to a determination that the unthreading of the tape is to be performed (as illustrated by the "Yes" logical path leading from decision 1112) a determination may be made as to whether to write an index in the data partition and/or the index partition prior to unthreading the tape. Such determination that the index may be written in the data partition and/or the index partition of the tape may be based on the value of the flag(s), e.g., the first flag and/or the second flag, as will now be described.

According to various embodiments, determining whether to write the index in the data partition of the tape prior to unthreading the tape may be based on the value of the first flag. Decision 1114 includes determining whether the first flag is set to the second value, thereby indicating that some change has been made to data on the tape.

In response to determining that the unthreading of the tape is to be performed and the first flag has the second value (as illustrated by the "Yes" logical path leading from decision 1114), the index may be written in the data partition of the tape prior to unthreading the tape, e.g., see operation 1116.

In response to writing the index in the data partition, e.g., see operation 1116, the first flag may be set to the first value, e.g., see operation 1118. With the first flag again set to the first value, any subsequent changes made to a file and/or a directory of the tape may be noted in the system performing method 1100 by setting the first flag to the second value from the first value.

If, at decision 1114, a determination is made that the first flag is set to the first value, then the process continues without writing an index in the data partition. This may occur, for example, where an index was written in the data portion prior to determining whether to unthread the tape.

A determination whether to write an index in the index partition of the tape may additionally and/or alternatively be made, e.g., in response to determining that unthreading of the tape is to be performed. According to various embodiments, a determination of whether to write the index in the index partition of the tape prior to unthreading the tape may be based on the value of the second flag. Decision 1120 includes determining if the second flag is set to the second value.

In response to determining that the second flag has the second value (as illustrated by the "Yes" logical path leading from decision 1120), an updated index may be written in the index partition of the tape prior to unthreading the tape, e.g., see operation 1122. This in turn prevents the tape from having to be rethreaded to write the index in response to receiving an unmount and/or unload command after performing the unthreading.

In response to writing the index in the index partition, e.g., see operation 1122, the second flag may be set to the first value, e.g., see operation 1124.

Operation 1126 of method 1100 includes unthreading the tape. According to various embodiments, the tape may remain mounted after the unthreading, may be unmounted, may be unloaded, etc.

Operation 1128 of method 1100 includes stopping the unthread monitor mechanism.

Any of the foregoing embodiments may additionally include writing an index in the data partition and/or an index in the index partition in response to receiving an unmount command.

According to various embodiments, an unmount command may be received from any source. According to various approaches, the unmount command may be received e.g., from a host, from a library controller, internally in the drive controller in response to receiving an unload command, etc. For example, an index may be written in the data partition in response to receiving the unmount command and determining that the first flag in method 1100 has the second value. In such embodiments, an index may additionally and/or alternatively be written in the index partition in response to receiving the unmount command and determining that the second flag has the second value.

It should be noted that although method 1100 includes setting the first flag and/or the second flag to a first value (e.g., False) during mounting processing, according to other embodiments, method 1100 may alternatively include setting the first flag and/or the second flag to a second value (e.g., True) during the mounting processing.

Various embodiments described herein may be effectuated through software-based functional extensions of existing LTFS by disabling automatic unthreading functions of tape drives.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A drive-implemented method, comprising:
   determining that unthreading of a tape is to be performed;
   in response to the determination that the unthreading of the tape is to be performed, determining whether to write an index on the tape prior to unthreading the tape, wherein determining whether to write the index on the tape prior to unthreading the tape includes determining whether to write the index in a partition of the tape, the partition being selected from a group consisting of an index partition and a data partition of the tape;
   in response to a determination to write the index on the tape, writing the index on the tape prior to unthreading the tape; and
   unthreading the tape.

2. The method as recited in claim 1, comprising setting a first flag to a first value during mounting processing; setting the first flag to a second value in response to making a change to at least one of a file and a directory on the tape; and setting the first flag to the first value in response to writing an index on the tape, wherein determining whether to write the index on the tape prior to unthreading the tape is based on the value of a first flag, wherein the index is written on the tape in response to the determination that the unthreading of the tape is to be performed when the first flag has the second value.

3. The method as recited in claim 1, comprising setting a first flag to a first value during mounting processing; setting the first flag to a second value in response to making a change to at least one of a file and a directory on the tape; setting the first flag to the first value in response to writing an index on the tape; receiving an unmount command; and writing an index on the tape in response to receiving the unmount command and determining that the first flag has the second value.

4. The method as recited in claim 1, comprising setting a second flag to a first value during mounting processing; and setting the second flag to a second value in response to making a change to at least one of a file and a directory on the tape, wherein determining whether to write the index on the tape prior to unthreading the tape is based on the value of a second flag, wherein the index is written on the tape in response to the determination that the unthreading of the tape is to be performed when the second flag has the second value.

5. The method as recited in claim 1, comprising setting a second flag to a first value during mounting processing; setting the second flag to a second value in response to making a change to at least one of a file and a directory on the tape; receiving an unmount command; and writing an index on the tape in response to receiving the unmount command and determining that the second flag has the second value.

6. The method as recited in claim 1, comprising receiving a write request after the unthreading; rethreading the tape; and writing data corresponding to the write request on the tape, wherein the index stored on the tape prior to the unthreading is overwritten with the data corresponding to the write request.

7. The method as recited in claim 1, wherein the determination that unthreading of the tape is to be performed is based on a predetermined period of time passing since a most recent access to the tape.

8. The method as recited in claim 1, comprising, prior to determining that unthreading of the tape is to be performed, writing an index to a data partition of the tape in response to a predetermined period of time passing since a most recent access to the tape, wherein the index is not written to an index partition of the tape in response to the predetermined period of time passing since the most recent access to the tape.

9. The method as recited in claim 1, wherein the tape remains mounted after the unthreading.

10. A computer program product comprising a computer readable storage medium having program instructions embodied therewith, the program instructions executable by a controller to cause the controller to:
   determine, by the controller, that unthreading of a tape is to be performed;
   in response to the determination that the unthreading of the tape is to be performed, determine, by the controller, whether to write an index in a data partition of the tape prior to unthreading the tape;
   in response to a determination to write the index in the data partition, instruct, by the controller, writing of the index in the data partition prior to unthreading the tape;
   in response to the determination that the unthreading of the tape is to be performed, determine, by the controller, whether to write the index in an index partition of the tape prior to unthreading the tape;
   in response to a determination to write the index in the index partition, instruct, by the controller, writing of the index in the index partition prior to unthreading the tape; and
   instruct, by the controller, a threading mechanism to unthread the tape.

11. The computer program product of claim 10, wherein the program instructions are executable by the controller to cause the controller to:
   set, by the controller, a first flag to a first value during mounting processing;
   set, by the controller, the first flag to a second value in response to making a change to at least one of a file and a directory on the tape; and
   set, by the controller, the first flag to the first value in response to writing an index in the data partition, wherein determining whether to write the index in the data partition of the tape prior to unthreading the tape is based on the value of a first flag, wherein the index is written in the data partition in response to the determination that the unthreading of the tape is to be performed when the first flag has the second value.

12. The computer program product of claim 10, wherein the program instructions are executable by the controller to cause the controller to:
   set, by the controller, a first flag to a first value during mounting processing;
   setting, by the controller, the first flag to a second value in response to making a change to at least one of a file and a directory on the tape; and
   set the first flag to the first value in response to writing an index in the data partition; receiving an unmount command; and
   writing an index in the data partition in response to receiving the unmount command and determining that the first flag has the second value.

13. The computer program product of claim 10, wherein the program instructions are executable by the controller to cause the controller to: set, by the controller, a second flag to a first value during mounting processing; and set, by the controller, the second flag to a second value in response to making a change to at least one of a file and a directory on the tape, wherein determining whether to write the index in the index partition of the tape prior to unthreading the tape is based on the value of a second flag, wherein the index is written in the index partition in response to the determination that the unthreading of the tape is to be performed when the second flag has the second value.

14. The computer program product of claim 10, wherein the program instructions are executable by the controller to cause the controller to: set, by the controller, a second flag to a first value during mounting processing; set, by the controller, the second flag to a second value in response to making a change to at least one of a file and a directory on the tape; receive, by the controller, an unmount command; and write, by the controller, an index in the index partition in response to receiving the unmount command and determining that the second flag has the second value.

15. The computer program product of claim 10, wherein the program instructions are executable by the controller to cause the controller to: receive, by the controller, a write request after the unthreading; rethread, by the controller, the tape; and write, by the controller, data corresponding to the write request in the data partition, wherein the index stored in the data partition prior to the unthreading is overwritten with the data corresponding to the write request.

16. The computer program product of claim 10, wherein the determination that unthreading of the tape is to be performed is based on a predetermined period of time passing since a most recent access to the tape.

17. The computer program product of claim 10, wherein the program instructions are executable by the controller to cause the controller to: prior to determining that unthreading of the tape is to be performed, write, by the controller, an index to the data partition in response to a predetermined period of time passing since a most recent access to the tape, wherein the index is not written to the index partition in response to the predetermined period of time passing since the most recent access to the tape.

18. The computer program product of claim 10, wherein the tape remains mounted after the unthreading.

19. An apparatus, comprising:
a controller; and
logic integrated with the controller, executable by the controller, or integrated with and executable by the controller, the logic being configured to:
determine, by the controller, that unthreading of a tape is to be performed;
determining that unthreading of a tape is to be performed;
in response to determining that the unthreading of the tape is to be performed, determine, by the controller, whether to write an index on the tape prior to unthreading the tape;
in response to a determination to write the index on the tape, write, by the controller, the index on the tape prior to unthreading the tape;
unthread the tape;
receive, by the controller, a write request after the unthreading;
rethread, by the controller, the tape; and
write, by the controller, data corresponding to the write request on the tape, wherein the index stored on the tape prior to the unthreading is overwritten with the data corresponding to the write request.

20. The apparatus as recited in claim 19, wherein the logic is configured to determine, by the controller, whether to write the index in a partition of the tape, the partition being selected from a group consisting of an index partition and a data partition of the tape.

21. The apparatus as recited in claim 19, wherein the logic is configured to:
set, by the controller, a first flag to a first value during mounting processing;
set, by the controller, the first flag to a second value in response to making a change to at least one of a file and a directory on the tape; and
set, by the controller, the first flag to the first value in response to writing an index on the tape, wherein determining whether to write the index on the tape prior to unthreading the tape is based on the value of a first flag, wherein the index is written on the tape in response to the determination that the unthreading of the tape is to be performed when the first flag has the second value.

22. The apparatus as recited in claim 19, wherein the logic is configured to:
set, by the controller, a first flag to a first value during mounting processing;
set, by the controller, the first flag to a second value in response to making a change to at least one of a file and a directory on the tape;
set the first flag to the first value in response to writing an index on the tape;
receive, by the controller, an unmount command; and
write, by the controller, an index on the tape in response to receiving the unmount command and determining that the first flag has the second value.

23. The apparatus as recited in claim 19, further comprising:
a magnetic head;
a drive mechanism for passing a magnetic medium over the magnetic head; and
the controller electrically coupled to the magnetic head.

* * * * *